United States Patent [19]
Houd

[11] 3,940,241
[45] Feb. 24, 1976

[54] ROTARY KILN PLANT

[75] Inventor: Rolf Dietrich Houd, Copenhagen Valby, Denmark

[73] Assignee: F. L. Smidth & Co., Cresskill, N.J.

[22] Filed: Jan. 17, 1975

[21] Appl. No.: 541,993

[30] Foreign Application Priority Data
Jan. 25, 1974 United Kingdom............ 3608/74

[52] U.S. Cl. .................. 432/106; 432/58; 432/78; 432/80; 432/85
[51] Int. Cl.² ................... F27B 7/02; F27B 15/16
[58] Field of Search ............ 432/58, 78, 80, 85, 106

[56] References Cited
UNITED STATES PATENTS

| | | | |
|---|---|---|---|
| 1,468,168 | 9/1923 | Pike | 432/80 |
| 3,358,977 | 12/1967 | Jensen | 432/106 |
| 3,416,778 | 12/1968 | Chabaglian | 432/78 X |
| 3,452,968 | 7/1969 | Shimizu et al. | 432/58 |
| 3,671,027 | 6/1972 | Frans | 432/80 |
| 3,834,860 | 9/1974 | Fukuda et al. | 432/106 |
| 3,864,075 | 2/1975 | Christiansen | 432/106 |
| 3,869,248 | 3/1975 | Hiral et al. | 432/58 |

*Primary Examiner*—John J. Camby
*Attorney, Agent, or Firm*—Pennie & Edmonds

[57] ABSTRACT

A rotary kiln plant for calcining and sintering mineral materials such as cement raw materials, comprising a separate unit for preheating and at least partially calcining the raw materials, a rotary kiln for sintering the preheated and calcined raw materials, a separate inside airswept rotary cooler means for cooling the materials burnt in the kiln, and a stationary chamber positioned intermediate the outlet of the rotary kiln and the inlet of the rotary cooler means and forming a passage for the burnt kiln product from the kiln to the rotary cooler means in countercurrent with heated cooling air passing to the rotary kiln. Air inlet and outlet means on the chamber make it possible to introduce additional cooling air and to utilize cooling air from the chamber for the preheating and calcining unit while by-passing the rotary kiln.

33 Claims, 4 Drawing Figures

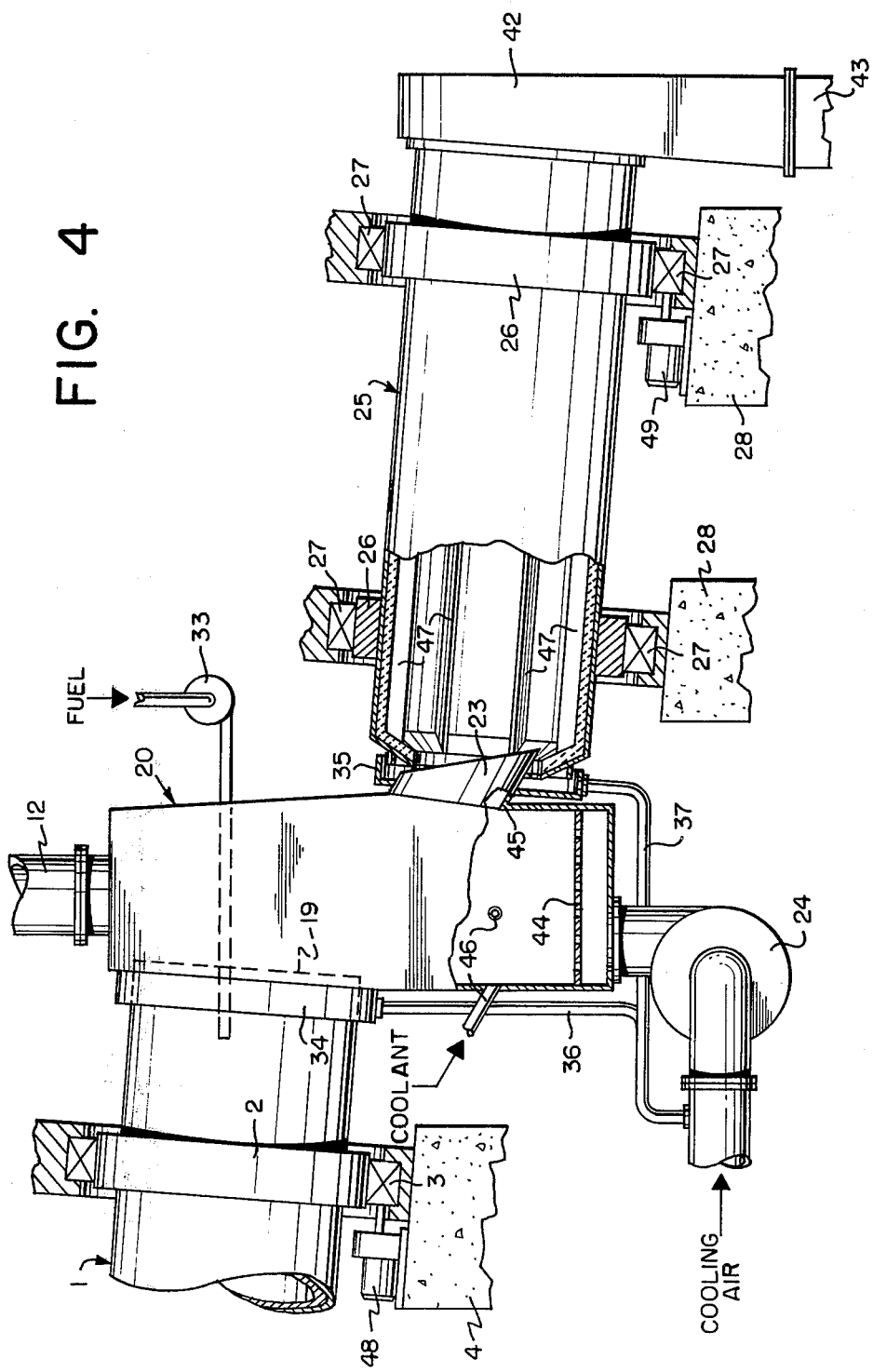

ROTARY KILN PLANT

BACKGROUND OF THE INVENTION

1. Field of the Invention

This invention relates to rotary kiln plants for calcining and sintering mineral materials such as cement raw meal.

2. Background of the Invention

Rotary kiln plants of the type contemplated are advantageous whenever manufacturing plants requiring high outputs are concerned. The manufacturing process is thus arranged to be performed in separate units in a number of stages comprising a preheater, a calcining unit, a sintering unit in the form of a short rotary kiln and a cooler unit for cooling the hot kiln product.

The treatment of the raw material — especially cement-forming raw materials such as cement raw meal — in units divided in stages of treatment according to the various heat exchange steps in the process has been found attractive, primarily because economical production of the material can be obtained, but also because in such a plant it is possible to provide careful supervision and automatic control of the manufacturing process.

In the rotary kiln in plants of the type having a separate calcining unit, the amount of air necessary for combustion in the kiln is small so that only part of the heated cooling air may be effectively utilized in the rotary kiln for recovering the heat content of the cooling air. Another part is therefore utilized as combustion air in the calcining unit.

In prior art plants of this type, the cooler comprises either a number of cooler tubes arranged in planetary fashion around the outlet end of the rotary kiln rotating with the kiln so that all the heated cooling air to be used as combustion air is drawn through the rotary kiln. Alternatively, a grate cooler is combined with the rotary kiln in such a manner that at least part of the heated cooling air is utilized in the rotary kiln as secondary combustion air, whereas another part is utilized for preheating or combustion purposes in the calcining process performed in the calcining unit associated with the preheater.

However, with a separate planetary cooler or rotary cooler it has hitherto not been possible to combine an effective cooling of the hot product with satisfactory use of the amounts of heated cooling air as combustion air in the process, because it is difficult to construct and arrange the passage between the kiln and the cooler in such a manner that the heated cooling air and the hot product may pass in countercurrent to each other without encountering difficulties. A narrow passage (or passages) gives rise to dust problems and the cooling efficiency of the rotary cooler may be too low unless part of the cooling air is removed from the rotary cooler to overcome this problem. This results in a high overall heat comsumption of the process. Furthermore, although sufficient amounts of air are passed to the rotary kiln for use in the combustion process, the volume of air may be insufficient to cool the outlet of the kiln, the passage and/or the inlet of the cooler. Such insufficient cooling may result in damage being caused to either the passage or the cooler, or both due to the heat from the hot product. On the other hand, it is imperative that as much as possible of the heat content of the hot product is recovered. I have invented a plant which avoids these disadvantages while optimizing the transfer of heat to maintain substantial efficiency in the production of cement clinker.

SUMMARY OF THE INVENTION

A rotary kiln plant for calcining and sintering mineral materials such as cement raw materials which comprises separate means for preheating and calcining the raw materials, a rotary kiln for burning the raw materials and a rotary cooler means for cooling the materials burnt in the rotary kiln. A stationary chamber is positioned intermediate the outlet portion of the rotary kiln and the inlet portion of the rotary cooler means in a manner to form a passage for the burnt kiln product from said kiln to said rotary cooler means in countercurrent with heated cooling air passing to said rotary kiln for use as combustion air. The intermediate chamber further comprises inlet means for the admission of additional cooling air into the chamber, and outlet means for discharging at least part of the preheated cooling air therefrom, said chamber outlet means communicating with said preheating and calcining means independently of the rotary kiln so as to bypass the rotary kiln.

According to a preferred embodiment of the invention, the plant is constructed in such a manner that the rotary kiln and the rotary cooler communicate through a stationary intermediate chamber forming a direct passage for the burnt product from the kiln to the rotary cooler in countercurrent with heated cooling air passing to the rotary kiln as combustion air. The stationary intermediate chamber has a separate inlet for the admission of the additional cooling air and an outlet for the discharge of at least part of the preheated cooling air and is connected directly with the combustion air inlet of the calcining unit through a pipe which by-passes the rotary kiln.

The raw material first passes in suspension through the preheater in countercurrent to the waste gases from the calcining unit and the rotary kiln. After being fully or partly calcined it proceeds to the rotary kiln for sintering (final burning) and is discharged through the outlet in the lower end of the kiln to the stationary intermediate chamber connecting the rotary kiln and the rotary cooler. In the cooler, air is passed in countercurrent to the hot material to be cooled.

When additional cooling air is supplied to the intermediate chamber, an effective quenching of the hot product is performed immediately after the hot product leaves the rotary kiln. At least a part of the air used for this quenching is then immediately removed through the kiln by-pass to the calcining unit. As a result of this quenching the rotary cooler receives a precooled product. Consequently, only a reduced amount of cooling air is necessary for final cooling in the rotary cooler. Such a reduction is advantageous to the performance of the cooler and to the passage of the heated cooling air out through the cooler material inlet, into the intermediate chamber, and into the rotary kiln. Part of the total amount of cooling air is passed directly out through the by-pass pipe from the intermediate chamber to the calcining unit, such as the air which is drawn off is from both the additional cooling air inlet and from the rotary cooler.

In this manner the heat contained in the heated cooling air may be recovered and utilized in the heat treatment processes so that a controlled amount of heated cooling air is used as combustion air in the rotary kiln and another controlled amount of heated cooling air is used as combustion air in the calcining unit. As a further result, the amount of heated cooling air to be passed out of the hot material inlet end of the rotary cooler is reduced so that the number of dust particles carried from the cooler and into the rotary kiln is substantially reduced.

It is advantageous to quench the hot product after it is discharged from the kiln and before it enters the rotary cooler. Such cooling substantially relieves the inlet parts of the rotary cooler from severe thermal and mechanical wear.

Preferably, the waste gas outlet from the rotary kiln is connected to one suspension preheater unit and the waste gas outlet from the calcining apparatus (using the cooler air from the outlet in the stationary intermediate chamber) is connected to a second suspension preheater unit, the gas outlets from both preheater units being subsequently united.

Also, the streams of combustion air, one of which passes through the rotary kiln and the other through the calcining apparatus, may to a large extent be controlled independently and individually, thereby enabling a proper adjustment of the processes in the calcining apparatus and in the rotary kiln. For example, control of the preferred division of the two gas streams may be arranged by means of fans at the outlets from the two preheater units before the waste gas outlets are joined into a single pipe which passes the waste gas to a precipitator for cleaning.

The intermediate chamber may be equipped with means for retaining part of the hot product on a grid acting as a fluidized-bed grid. For example, the intermediate chamber may include a substantially horizontal grid in the bottom portion. The charging of the grid is controlled by means of a weir plate controlling the overflow of material into the rotary cooler.

In a quenching step envisaged by the invention, a rapid and effective quenching of the hot product may take place and the air utilized both as fluidizing air and as cooling air may be removed through the discharge opening in the intermediate chamber without having to pass through the rotary kiln.

Alternatively, the intermediate chamber may be provided with a horizontal or inclining movable grate for further transport of the material through the chamber. In this case such effective heat exchange is achieved that a considerable drop in the temperature of the hot product is obtained. Also, the cooling air is heated sufficiently to serve as preheated combustion air.

The rotary cooler tube is preferably provided with built-in devices serving to transport and lift the material. When only limited amounts of cooling air are passed through the rotary cooler of the type contemplated it is important to secure an intimate contact between the hot material and the cooling air. This contact can be obtained by using such transporting and lifting means for lifting and dropping the hot material repeatedly across the stream of cooling air.

It is also advantageous to provide the rotary cooler tube with a number of secondary cooler tubes arranged in planetary fashion around the outlet end of the main rotatable cooler tube. Planetary cooler tubes arranged in such a manner improve the heat exchange efficiency and are particularly useful when the rotary kiln plant is designed for a high output. An additional advantage is obtained when only part of the necessary cooling air must pass through the planetary cooler tubes. Otherwise, the chutes through which they communicate with the interior of the central tube give rise to problems in connection with the transfer of material to the planetary cooler tubes and cause dust circulation at the cooler tube inlets because of the increased air velocity due to the narrow passage through the narrow chutes.

Further improvements in the cooling efficiency of the intermediate chamber and the rotary cooler may be obtained if the plant is arranged so that the intermediate chamber, or the rotary cooler, or both are provided with means for the injection of cooling water. Although it is imperative for the economy of the plant that the amounts of cooling air are carefully matched with the amounts of combustion air needed, minor amounts of excess cooling air may be passed through the rotary kiln or through the by-pass passage to the calcining unit for dedusting in the plant precipitator without substantially affecting the heat economy of the plant. However, the injection of cooling water may serve as a means of controlling the temperature and of adjusting the amounts of cooling air. In addition to improving the cooling effect of the cooler, the water serves to humidify and condition the heated cooling air before it is passed to the rotary kiln or the calcining unit as combustion air.

In a modification of the preferred embodiment, the stationary intermediate chamber may be provided with air-vented sealing means such as labyrinth seals, at its junction with both the kiln and cooler in such a manner that the air drawn from the sealing means passes to the suction side of the fan supplying cooling air to the intermediate chamber. When using sealing means of this type, considerable amounts of air must be drawn through the sealing means to obtain effective cooling of the parts adjoining the sealings, and the sealing means to thereby avoid damage to the components of the plant, particularly the outlet end of the kiln.

By utilizing the spent sealing air as part of the additional cooling air supply to the intermediate chamber, the heat content of the sealing air is recovered and utilized when the heated cooling air is used as combustion air. Also it is advantageous in that dust coming from the sealings is avoided and that dust contained in the sealing air is reintroduced into the plant via the additional cooling stream.

BRIEF DESCRIPTION OF THE DRAWINGS

Preferred embodiments of the invention are described hereinbelow with reference to the drawings wherein:

FIG. 4 is a side elevation of the lower end of another alternate embodiment of the invention illustrating a third rotary kiln plant with a rotary cooler and a slightly modified intermediate cooling chamber.

DETAILED DESCRIPTION OF THE PREFERRED EMBODIMENTS

Figure 1:
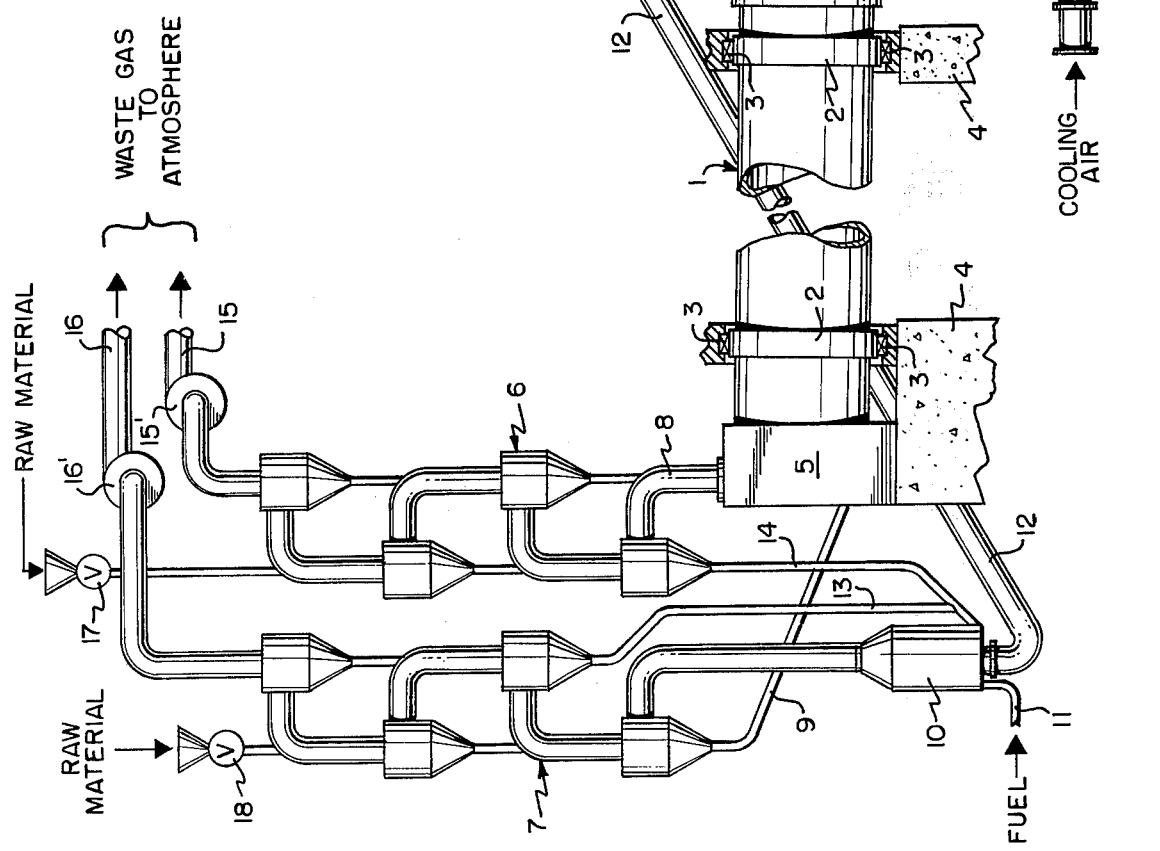
FIG. 1 is a side elevation of a rotary kiln plant constructed according to the invention.

The kiln plant shown in FIG. 1 has a rotary kiln 1 having a number of live rings 2 supported by means of bearing rollers 3 on foundations 4, and the outlet end of the rotary kiln has a smoke gas chamber 5 supported on the foundation 4.

The smoke gas chamber 5 is connected with a preheater comprising two separate units 6 and 7, one unit 6 of which is connected to the smoke gas chamber 5 by means of a smoke gas outlet duct 8. A material outlet pipe 9 serves to connect both units 6 and 7 to the rotary kiln through the smoke gas chamber 5.

Both preheater units are composed of a number of series-connected preheater cyclones with corresponding riser pipes, and gas and material pass countercurrently through the preheaters.

The preheater unit 7 has at its bottom, a calcining unit 10 with a fuel inlet pipe 11 and a connecting tube 12 for the supply of combustion air. It is fed with material from both preheaters by means of feed pipes 13 and 14.

The preheater units 6 and 7 have separate waste gas outlet tubes 15 and 16, each with a fan 15' and 16' respectively, from which the waste gas may pass to a precipitator (not shown) or through a chimney (not shown) into the atmosphere. Raw material to be treated in the rotary kiln plant is fed to the preheaters 6 and 7 through feed valves 17 and 18 respectively.

The discharge end 19 of the rotary kiln 1 communicates with a stationary intermediate cooling chamber 20 having a discharge opening 21 for air to the connecting tube 12, a bottom opening 22 for the admission of cooling air, and a material discharge opening 23. The bottom opening 22 is connected to a fan 24 for the supply of air. The discharge opening 23 of the intermediate chamber opens into a rotary cooler 25 having live rings 26 supported by means of bearing rollers 27 on foundations 28. The rotary cooler 25 has a number of planetary cooler tubes 29 communicating with the interior of the main rotary cooler tube 25 through openings 30 and with discharge of material into a stationary casing 31 with a bottom outlet 32. Fuel is supplied to the rotary kiln through a burner aggregate 33.

Figure 2:
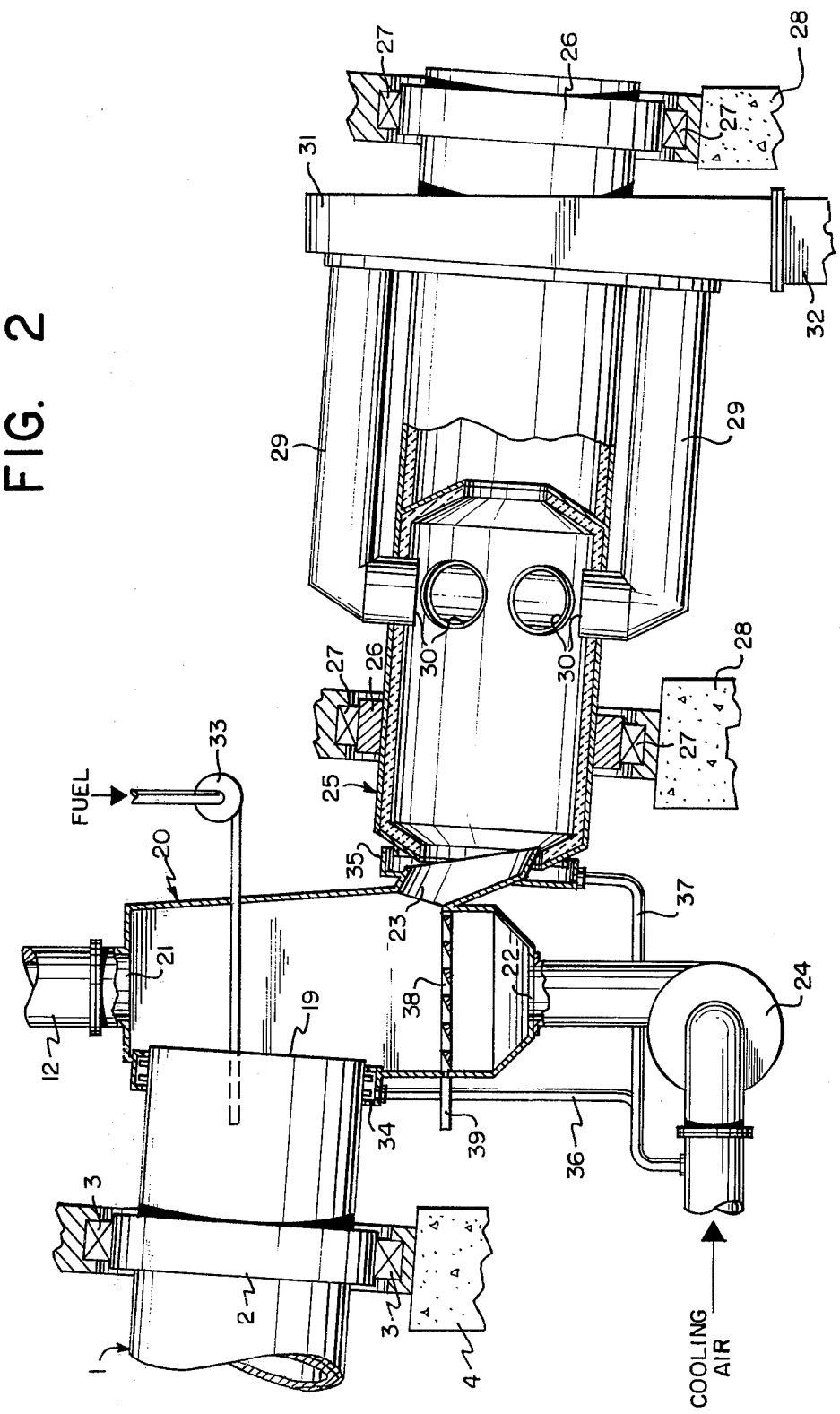
FIG. 2 shows a side elevation of the lower end portion of the rotary kiln plant shown in FIG. 1.

In FIG. 2 the lower end of the rotary kiln, the intermediate chamber, and the rotary cooler of the plant shown in FIG. 1 are shown in more detail and partly in section. The intermediate cooling chamber 20 has air-vented labyrinth sealings 34 and 35 at its junction with both kiln and cooler and these are connected by means of pipes 36 and 37 to the suction side of the cooling air fan 24.

The intermediate cooling chamber has a transporting grate 38, which, via link 39, is movable by devices not shown in the drawing.

Figure 3:
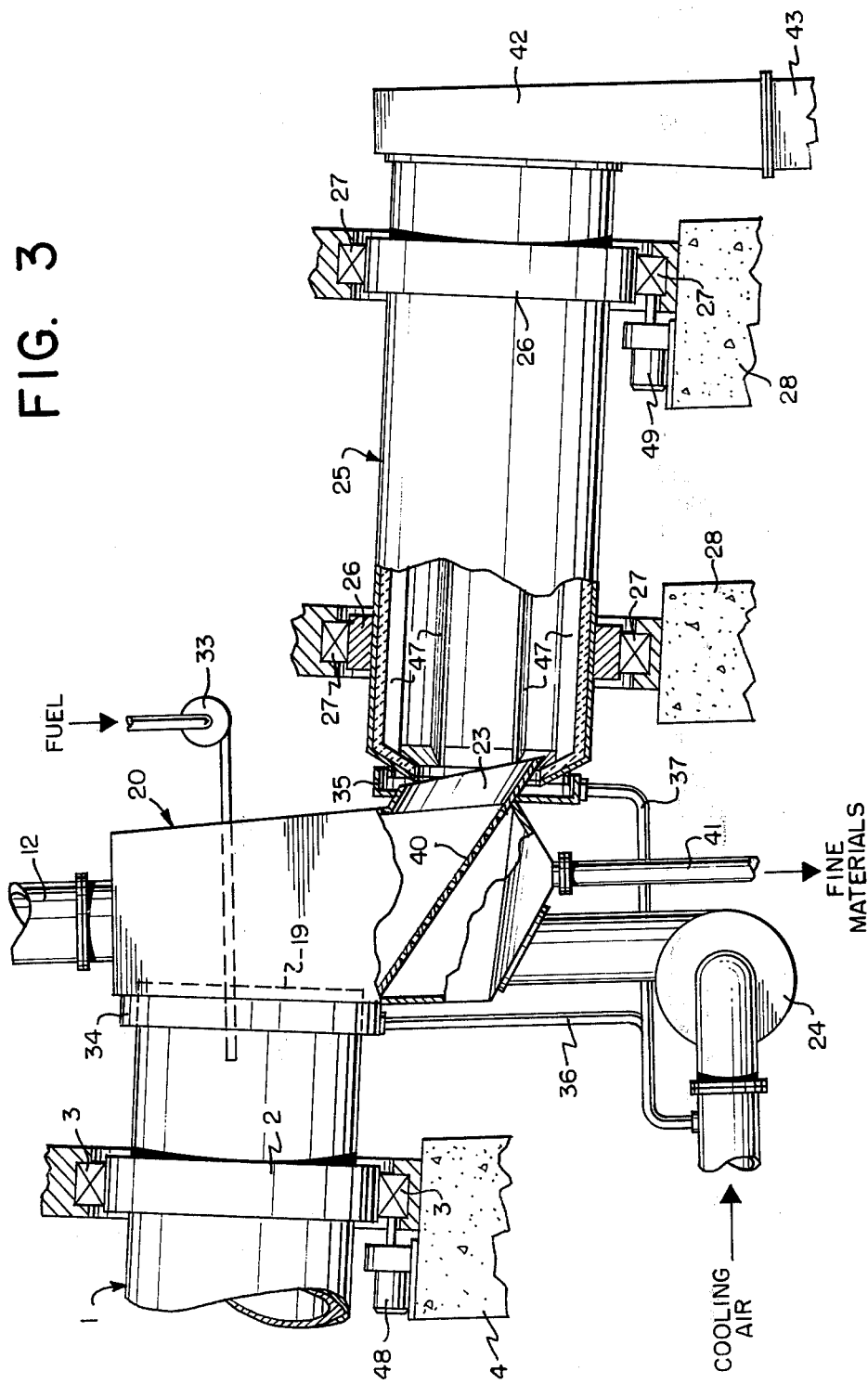
FIG. 3 is a side elevation of the lower end of an alternate embodiment of the invention illustrating a second rotary kiln plant with a rotary cooler tube and an intermediate cooling chamber.

FIGS. 3 and 4 show modified types of intermediate cooling chambers 20 cooperating with a rotary cooler tube 25. The intermediate cooling chamber shown in FIG. 3 has a stationary grid 40 for guiding the material into the cooler tube 25. Furthermore, the bottom of the cooling chamber has an outlet 41 for discharge of fine grained material passing through the grid 40. The cooler tube discharges into a stationary casing 42 with a bottom outlet 43.

In the modified construction shown in FIG. 4 the bottom of the intermediate cooling chamber is constructed as a fluidized bed having an air penetrable bottom plate 44 and an overflow weir plate 45. Cooling water or another cooling medium may be injected through pipes 46. The cooler tube 25 is equipped with lifters 47.

The rotary kiln 1 is arranged to be driven from a driving station 48 comprising gears and an electric motor and the rotary cooler is likewise arranged to be driven by its own driving station 49 also comprising gears and an electric motor. The two units may thus be rotated independently of one another.

In operation, raw material, say cement raw material, for the production of cement clinker, is fed to the plant through the feed valves 17 and 18 in controlled quantities, for instance by means of weigh feeders. In the rotary kiln 1 and in the calcining unit 10, burning is performed by means of fuel introduced through the burner aggregate 33 and the fuel pipe 11, respectively, and by means of combustion air fed through the opening 19 and the combustion air pipe 12, respectively.

The raw material descends through the preheater cyclones of the two preheater units 6 and 7 and is preheated by the waste gases passing upwards through the preheater units. The preheated raw material from both preheater units is passed via feed pipes 13 and 14 to the calcining unit 10 and from there to the rotary kiln 1, in which final burning or sintering takes place.

The burnt product is discharged through the lower outlet end 19 of the rotary kiln into the stationary intermediate cooling chamber 20. Cooling air is blown, by means of the fan 24, into the intermediate cooling chamber and an effective quenching of the hot product is thereby performed. At the same time the cooling air is heated to a substantial temperature before it proceeds as combustion air into the rotary kiln or out of the discharge opening 21 to the pipe 12 leading to the calcining unit.

The quenched product is discharged from the stationary intermediate chamber into the rotary cooler tube 25, in which further cooling of the product takes place in a heat-exchange process with cooling air introduced through the casing 31 (or 42 in the modified arrangement of FIGS. 3 and 4).

Lifters 47 shown in FIGS. 3 and 4 transport the hot product through the cooler tube and lift and discharge it repeatedly into the cooling air stream passing in countercurrent through the tube. The heated cooling air is united with the heated cooling air from the intermediate cooling chamber and the total stream of heated cooling air is divided into the two heated cooling air streams passing as combustion air into the rotary kiln and through the pipe 12 into the calcining unit.

It is essential that the amounts of cooling air are correlated with the amounts of combustion air required in the process, and the stationary intermediate cooling chamber affords a prompt and effective heat exchange between the air and the hot product which, if necessary, may be assisted by water spraying.

The intermediate cooling chamber enables a proper division of the cooling air streams so that all of the heated cooling air is passed into and through the calcining unit and the sintering unit in divided streams in such a manner that it is unnecessary to install filters to clean possible excess cooling air. Furthermore, the quenching of the hot product before it is passed to the rotary cooler ensures that the amounts of cooling air required in the rotary cooler are reduced so that the velocity of the air passing through the rotary cooler can be kept to a moderate level to avoid dust nuisance, especially at the restricted passage of the material inlet end of the rotary cooler.

The heat exchange in the intermediate cooling chamber is improved with the use of a horizontal or inclining movable grate or a fluidized-bed grid whereby a certain layer of hot material is retained in the intermediate chamber. The air sealings of the connections between the stationary intermediate cooling chamber and the rotary kiln and the rotary cooler cool and protect those parts and provide a favorable solution to the sealing problem since the escaping air is recirculated to the cooling chamber.

I claim:

1. A rotary kiln plant for calcining and sintering mineral materials such as cement raw materials which comprises separate means for preheating and calcining the raw materials, a rotary kiln for burning the raw materials and a rotary cooler means for cooling the materials burnt in the rotary kiln, a stationary chamber positioned intermediate the outlet portion of the rotary kiln and the inlet portion of the rotary cooler means in a manner to form a passage for the burnt kiln product from said kiln to said rotary cooler means in countercurrent with heated cooling air passing to said rotary kiln for use as combustion air, inlet means on said intermediate chamber for the admission of additional cooling air into said chamber, and outlet means on said intermediate chamber for discharging at least part of the preheated cooling air therefrom, said chamber outlet means communicating with said preheating and calcining means independently of said rotary kiln so as to by-pass said rotary kiln.

2. The rotary kiln plant according to claim 1 wherein said separate means for preheating and calcining said raw materials comprises a separate suspension preheater for preheating the raw materials, and a calcining unit for calcining the preheated raw materials.

3. The rotary kiln plant according to claim 2 further comprising means to connect the waste gas outlet of the rotary kiln to a first suspension preheater unit, means to connect the waste outlet of the calcining unit to a second suspension preheater unit, and means connecting the outlet of said stationary intermediate chamber with the combustion air inlet of said calcining unit, said calcining unit utilizing heated cooling air from said stationary intermediate chamber as combustion air.

4. The rotary kiln plant according to claim 2 wherein said intermediate chamber further comprises means for retaining at least a part of the hot kiln product on a grid which acts as a fluidized-bed grid.

5. The rotary kiln plant according to claim 3 wherein said intermediate chamber further comprises means for retaining at least a part of the hot kiln product on a grid which acts as a fluidized-bed grid.

6. The rotary kiln plant according to claim 2 wherein said intermediate chamber further comprises at least one of a horizontal and inclining movable grate adapted for receiving the burnt kiln products within said chamber.

7. The rotary kiln plant according to claim 3 wherein said intermediate chamber further comprises at least one of a horizontal and inclining movable grate adapted for receiving the burnt kiln products within said chamber.

8. The rotary kiln plant according to claim 2 wherein said intermediate chamber further comprises at least one of a movable horizontal and inclining grate adapted for transporting the burnt kiln products from said rotary kiln to said rotary cooler means.

9. The rotary kiln plant according to claim 3 wherein said intermediate chamber further comprises at least one of a movable horizontal and inclining grate adapted for transporting the burnt kiln products from said rotary kiln to said rotary cooler means.

10. The rotary kiln plant according to claim 2 wherein said rotary cooler means further comprises means positioned therein to transport and lift the material to be cooled.

11. The rotary kiln plant according to claim 3 wherein said rotary cooler means further comprises means positioned therein to transport and lift the material to be cooled.

12. The rotary kiln plant according to claim 4 wherein said rotary cooler means further comprises means positioned therein to transport and lift the material to be cooled.

13. The rotary kiln plant according to claim 6 wherein said rotary cooler means further comprises means positioned therein to transport and lift the material to be cooled.

14. The rotary kiln plant according to claim 8 wherein said rotary cooler means further comprises means positioned therein to transport and lift the material to be cooled.

15. The rotary kiln plant according to claim 2 wherein said rotary cooler means further comprises a plurality of secondary cooler tubes arranged in a planetary fashion around the outlet end of the main rotatable cooler tube.

16. The rotary kiln plant according to claim 3 wherein said rotary cooler means further comprises a plurality of secondary cooler tubes arranged in a planetary fashion around the outlet end of the main rotatable cooler tube.

17. The rotary kiln plant according to claim 4 wherein said rotary cooler means further comprises a plurality of secondary cooler tubes arranged in a planetary fashion around the outlet end of the main rotatable cooler tube.

18. The rotary kiln plant according to claim 6 wherein said rotary cooler means further comprises a plurality of secondary cooler tubes arranged in a planetary fashion around the outlet end of the main rotatable cooler tube.

19. The rotary kiln plant according to claim 8 wherein said rotary cooler means further comprises a plurality of secondary cooler tubes arranged in a planetary fashion around the outlet end of the main rotatable cooler tube.

20. The rotary kiln plant according to claim 10 wherein said rotary cooler means further comprises a plurality of secondary cooler tubes arranged in a planetary fashion around the outlet end of the main rotatable cooler tube.

21. The rotary kiln plant according to claim 2 further comprising means to inject cooling water into at least one of said intermediate chamber and said rotary cooler means.

22. The rotary kiln plant according to claim 3 further comprising means to inject cooling water into at least one of said intermediate chamber and said rotary cooler means.

23. The rotary kiln plant according to claim 4 further comprising means to inject cooling water into at least one of said intermediate chamber and said rotary cooler means.

24. The rotary kiln plant according to claim 6 further comprising means to inject cooling water into at least one of said intermediate chamber and said rotary cooler means.

25. The rotary kiln plant according to claim 8 further comprising means to inject cooling water into at least one of said intermediate chamber and said rotary cooler means.

26. The rotary kiln plant according to claim 10 further comprising means to inject cooling water into at least one of said intermediate chamber and said rotary cooler means.

27. The rotary kiln plant according to claim 15 further comprising means to inject cooling water into at least one of said intermediate chamber and said rotary cooler means.

28. The rotary kiln plant according to claim 2 further comprising air-vented sealing means associated with said intermediate chamber and positioned at the junction between said intermediate chamber and said rotary kiln and rotary cooler means, means communicating said air-vented sealing means with the suction side of a fan adapted to supply cooling air to said intermediate chamber to thereby recover the heat content of the sealing air when the heated cooling air is subsequently utilized as combustion air.

29. The rotary kiln plant according to claim 3 further comprising air-vented sealing means associated with said intermediate chamber and positioned at the junction between said intermediate chamber and said rotary kiln and rotary cooler means, means communicating said air-vented sealing means with the suction side of a fan adapted to supply cooling air to said intermediate chamber to thereby recover the heat content of the sealing air when the heated cooling air is subsequently utilized as combustion air.

30. The rotary kiln plant according to claim 4 further comprising air-vented sealing means associated with said intermediate chamber and positioned at the junction between said intermediate chamber and said rotary kiln and rotary cooler means, means communicating said air-vented sealing means with the suction side of a fan adapted to supply cooling air to said intermediate chamber to thereby recover the heat content of the sealing air when the heated cooling air is subsequently utilized as combustion air.

31. The rotary kiln plant according to claim 10 further comprising air-vented sealing means associated with said intermediate chamber and positioned at the junction between said intermediate chamber and said rotary kiln and rotary cooler means, means communicating said air-vented sealing means with the suction side of a fan adapted to supply cooling air to said intermediate chamber to thereby recover the heat content of the sealing air when the heated cooling air is subsequently utilized as combustion air.

32. The rotary kiln plant according to claim 21 further comprising air-vented sealing means associated with said intermediate chamber and positioned at the junction between said intermediate chamber and said rotary kiln and rotary cooler means, means communicating said air-vented sealing means with the suction side of a fan adapted to supply cooling air to said intermediate chamber to thereby recover the heat content of the sealing air when the heated cooling air is subsequently utilized as combustion air.

33. A rotary kiln plant for calcining and sintering cement raw materials which comprises separate means for preheating said raw materials in the form of at least two suspension cyclone preheaters, a calcining apparatus for calcining the cement raw materials preheated in said cyclone preheaters, a rotary kiln for sintering the cement raw materials, a rotary cooler means for cooling the materials sintered in the rotary kiln, said rotary cooler means having a plurality of cooler tubes arranged in a planetary fashion around an outlet end of a main rotary cooler tube, a stationary chamber positioned intermediate the outlet end of the rotary kiln and the inlet end of the rotary cooler and communicating therewith so as to form a passage for the sintered cement clinker from said kiln to said rotary cooler in countercurrent with heated cooling air passing to said rotary kiln for use as combustion air, a stationary inlet means on said intermediate chamber adapted for admitting additional cooling air into said chamber, an outlet means on said chamber adapted for discharging at least part of the preheated cooling air therefrom, a conduit connected to the preheated cooling air outlet of said intermediate chamber and communicating with the combustion air inlet of said calcining apparatus, a conduit connecting the air outlet end of said calcining apparatus with at least one suspension cyclone preheater, a fan positioned and adapted to direct cooling air into said intermediate cooling chamber, a fan associated with each suspension preheater and positioned and adapted to direct cooling air through said preheaters in controlled correlation with the air required in the calcining process, said preheater control combining with said stationary intermediate cooling chamber to provide effective and efficient heat exchange between the hot kiln product and the air passing through the system.

\* \* \* \* \*